May 24, 1927. 1,629,465
A. ABBAMONTE
DRAIN VALVE
Filed Oct. 18, 1922 2 Sheets-Sheet 1
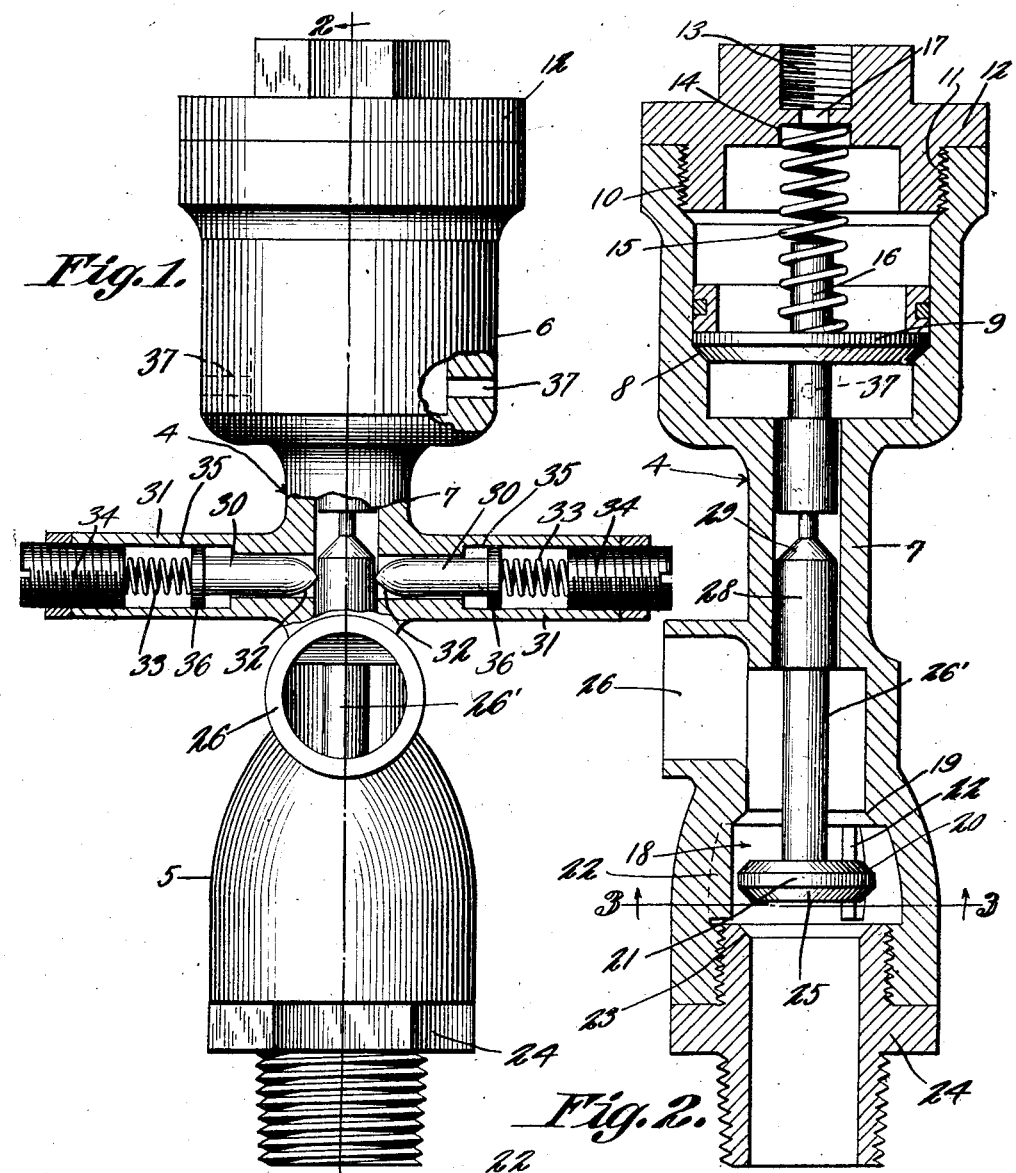
Inventor
A. Abbamonte.
By C. A. Snow & Co.
Attorneys.

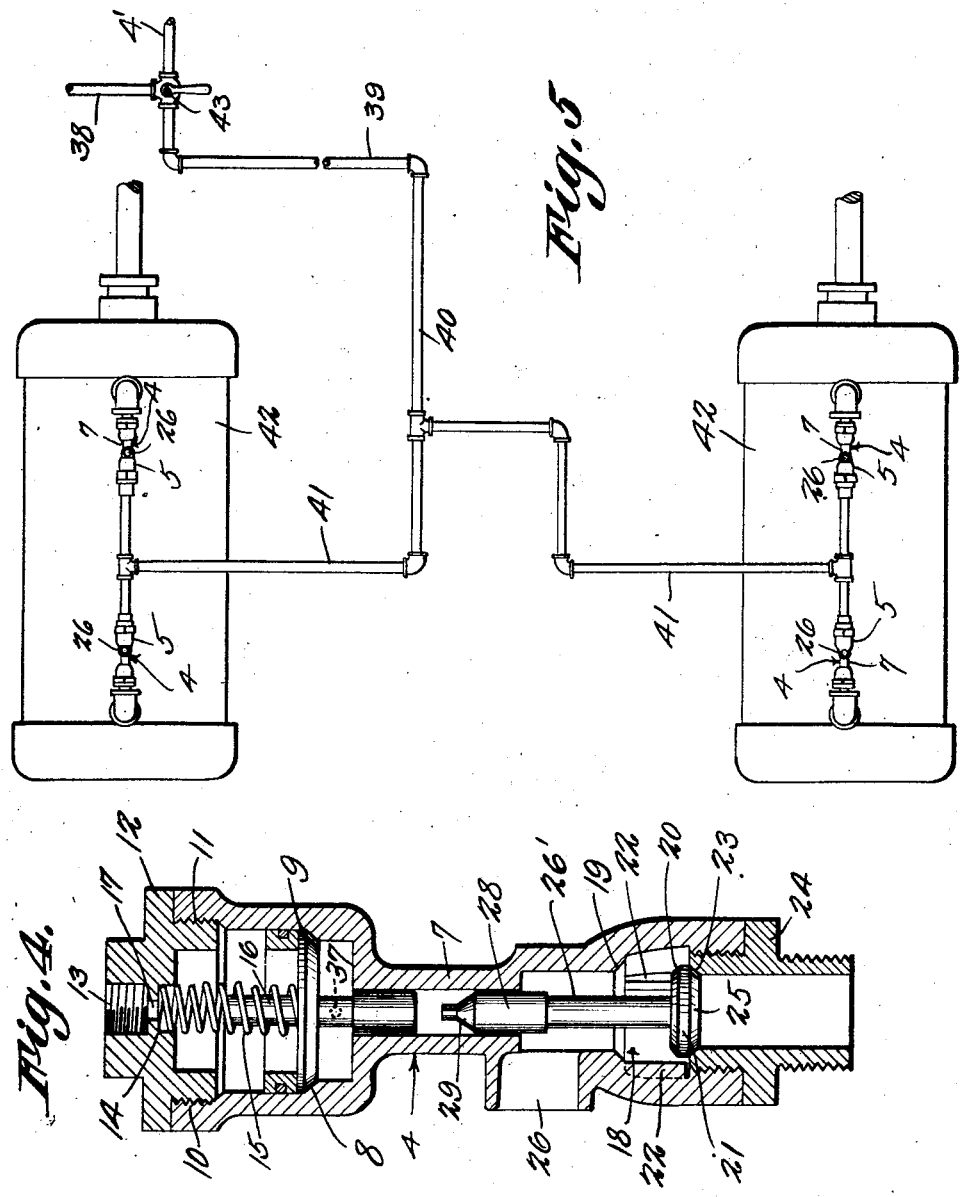

Patented May 24, 1927.

1,629,465

UNITED STATES PATENT OFFICE.

ANTISTENE ABBAMONTE, OF CHEYENNE, WYOMING.

DRAIN VALVE.

Application filed October 18, 1922. Serial No. 595,311.

This invention relates to valves, and more particularly to automatically controlled valves employed in connection with engine cylinders, the primary object of the invention being to provide a valve designed to drain automatically the condensed steam and leaks in the feed pipes while the throttle is closed.

Another object of the invention is to provide means for cutting off the passage way between the valve and engine associated therewith, thereby preventing a waste of steam to the atmosphere when the throttle is open.

A still further object of the invention is to provide a valve which will automatically close when the engine is drifting thereby preventing dirt or cold air from entering the cylinder associated therewith.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of a valve constructed in accordance with the present invention, the central portion of the valve being shown in section.

Figure 2 is a longitudinal sectional view through the valve taken on line 2—2 of Figure 1.

Figure 3 is a sectional view on line 3—3 of Figure 2.

Figure 4 is a sectional view through the valve, showing the valve members seated.

Figure 5 is a diagrammatic view illustrating the cylinders and connecting pipes.

Referring to the drawing in detail, the valve forming the essence of the present invention is indicated by the reference character 4. The reference character 5 designates the lower casing of the valve, while the reference character 6 designates a cylinder at the upper end thereof, the casing and cylinder being connected as by means of the pipe 7, as clearly shown by Figure 2 of the drawing.

The cylinder 6 is provided with a shoulder 8 to accommodate the piston 9, to be hereinafter more fully described. Threads 10 are provided at the upper extremity of the cylinder 6 and accommodate the threads 11 of the plug 12, which is also formed with a threaded opening 13 to permit the cylinder 6 to be connected with air or steam pressures.

The depressed portion 14 formed in the plug 12 acts as a seat to accommodate one end of the coiled spring 15 which has a portion thereof embracing the piston rod 16 to normally urge the piston 9 to the shoulder 8. An opening 17 provides a passageway for fluid held in the cylinder 6 above the piston 9 so that pressure at the upper side of the piston 9 may be relieved to permit of movement of the piston.

A valve housing 18 is formed with a valve seat 19 cooperating with the beveled edge 20 of the valve head 21 to cut off the passage of steam through the valve housing. This valve member 21 operates between the flanges 22, which hold the valve member in upright positions to insure the same seating properly.

A valve seat 23 is formed at the upper end of the union 24 which is thrown as threaded in the lower casing 5, the valve seat cooperating with the beveled edge 25 of the valve 21 to cut off the passage of cold air and dirt when engine is drifting.

Directly above the valve housing 18 is an outlet opening 26 through which steam and water escapes to atmosphere.

Valve rod 26' supports the valve 21 and has an enlargement 28 formed at the upper end thereof, the enlargement having a tapered extremity 29 designed to cooperate with the sliding pins 30 to normally lock the valve 21 to its seat 23. The locking pins 30 are mounted in the lateral guideways 31 and have their forward ends tapered as at 32 to engage behind the tapered end of the enlargement 28 of the valve stem, and as shown, the tapered end 29 of the enlargement 28 normally lies in a plane above the locking pins 30 so that when the valve 21 is moved to its seat 23, the pins will move over the tapered end 29 to lock the valve in position on its seat 23, temporarily.

Coiled springs 33 urge the locking pins towards the valve stem, adjusting screws 34 operating in the ends of the lateral extension to adjust the tensions of the springs 33 to cause the locking pins to lock and hold the valve 21 to its seat, against predetermined degrees of pressure.

The lateral guideways 31 are formed with shoulders 35 providing abutments for the flange 36 formed at the outer ends of the pins 30 so that movement of the pins will be restricted. Formed in the cylinders 6 are vent openings 37 to permit any moisture which may collect in the casing to pass outwardly therefrom.

As shown by Figure 5, steam is admitted to the valves through the pipes 38, 39, 40 and pipes 41 that support the valves from where the steam passes to the cylinders 42, the passage of the steam being controlled by the three-way valve 43. This three-way valve may be moved to a position to establish communication between pipes 38 and 39 to supply the valves 4 with steam. When it is desired to release the steam in the valves 4, the three-way valve may be moved to establish communication between the valve 4 and the discharge pipe 4'. The three-way valve may also be moved to trap the steam in the valves to automatically operate the valve as hereinafter described.

In the operation of the device, when the steam throttle is open, the steam pressure contacting with valve 21 closes same on the seat 19 and moves the piston 9 upwardly. When the throttle is closed and the steam pressure is lower than the tension of the spring 15, piston 9 moves downwardly, and opens valve 21 allowing all of the fluid to escape through the union 24 and into chamber 18, where the same passes to the atmosphere through outlet 26.

When the engine is drifting and the throttle is closed, a vacuum is formed in the feed pipes, steam chests and cylinders which closes valve 21 on the valve seat 23, which is held in place temporarily by the locking pins 30 moving on the tapered extremities 29 of the enlargement 28 thereby preventing cold air or dirt entering the cylinder from the opening 26.

When the engineer opens the cylinder cock while engine is working under full steam, he opens the three-way cock 43, which is connected to opening 13 and main air reservoir. This moves piston 9 downwardly on shoulder 8, the steam pressure entering union 24 and opens valve 21 allowing the steam to blow out of opening 26. When the three-way cock is closed opening 13 is exposed to the atmosphere and steam pressure on valve 21 closes same on the seat 19 and moves piston 9 upwardly.

Having thus described the invention, what is claimed as new is:

1. In a valve construction, a body portion, a cylinder at one end of the body portion, a casing at the other end of the body portion, a pipe establishing communication between the cylinder and casing, said cylinder having its upper end open to admit fluid under pressure, a spring pressed piston operating in the cylinder, a shoulder in the cylinder forming a seat for the piston, said piston adapted to normally seat on the shoulder to cut off communication between the outer end of the cylinder and casing, spaced valve seats in the casing, a valve operating between the valve seats, and having a valve rod extending therefrom, said piston adapted to move downwardly to unseat the valve, and means disposed between the piston and valve for temporarily holding the valve against movement.

2. In a valve construction, a body portion, a cylinder at one end of the body portion and a casing at the opposite end of the body portion, said cylinder having a shoulder, a piston operating in the cylinder and engaging said shoulder, spaced valve seats in the casing, a valve operating in the casing, and adapted to seat on the valve seats, said valve including a valve stem adapted to engage the piston, said valve stem having a tapered extremity, and spring pressed pins adapted to engage the tapered extremity of the valve stem to hold said valve on one of its seats.

3. In a valve construction, a body portion, a cylinder at one end of the body portion, a casing at the other end of the body portion, said cylinder having a shoulder, and said casing having spaced valve seats, a piston in the cylinder adapted to be normally held against said shoulder, a valve in the casing and including a valve rod, said valve adapted to be unseated by fluid pressure in the casing, spring pressed pins cooperating with the valve rod to hold the valve on one of its seats, and means for adjusting the tension of the springs to regulate the action of the pins.

In testimony that I claim the foregoing as my own, I have hereto affixed my signature.

ANTISTENE ABBAMONTE.